(12) United States Patent  (10) Patent No.: US 8,217,944 B1
Jiang  (45) Date of Patent: Jul. 10, 2012

(54) SYSTEMS AND METHODS FOR SELECTING VARIABLE TRANSFORMATIONS

(75) Inventor: Jincai Jiang, Plainsboro, NJ (US)

(73) Assignee: Morgan Stanley, New York, NY (US)

( * ) Notice: Subject to any disclaimer, the term of this patent is extended or adjusted under 35 U.S.C. 154(b) by 927 days.

(21) Appl. No.: 11/508,065

(22) Filed: Aug. 22, 2006

(51) Int. Cl.
*G06T 11/20* (2006.01)

(52) U.S. Cl. .................................................. 345/440
(58) Field of Classification Search .................. 345/440
See application file for complete search history.

(56) References Cited

U.S. PATENT DOCUMENTS

| | | | |
|---|---|---|---|
| 4,567,610 A * | 1/1986 | McConnell | 382/170 |
| 6,384,847 B1 * | 5/2002 | Rabenhorst | 715/804 |
| 6,429,868 B1 * | 8/2002 | Dehner et al. | 345/440 |
| 2001/0018694 A1 * | 8/2001 | Iwamoto et al. | 707/509 |
| 2006/0202037 A1 * | 9/2006 | Gunawardena et al. | 235/462.15 |

* cited by examiner

*Primary Examiner* — Edward Martello
(74) *Attorney, Agent, or Firm* — K&L Gates LLP

(57) ABSTRACT

A computer-assisted method of determining whether a set of data is to be graphically plotted in linear space or logarithmic space. The method includes receiving a set of data points to be plotted, classifying the data points, and computing a first entropy of a frequency of the data points. The method also includes computing a logarithmic transformation of each of the data points, classifying the logarithmically transformed data points, computing a second entropy of a frequency of the logarithmically transformed data points, and graphically plotting the data points in one of linear space and logarithmic space based on a comparison of the first entropy and the second entropy.

13 Claims, 4 Drawing Sheets

SYSTEMS AND METHODS FOR SELECTING VARIABLE TRANSFORMATIONS

BACKGROUND

It is oftentimes desirable to represent variable data on a plot. Depending on the distribution of such variable data, the plot may be better represented as a logarithmic plot as opposed to a linear plot, or vice versa. For example, financial data such as market capitalizations and revenue are generally better represented as logarithmic plots because such plots tend to show linear relationships that may be more useful in data analysis. Also, it may be advantageous to perform data analysis of variable data that is represented as a logarithmic plot to overcome the heteroskedasticity of the variable data (i.e., the variables have different variances). Thus, there is a need for a method of selecting whether variable data should be plotted in linear space or logarithmic space.

SUMMARY

In various embodiments, the present invention is directed to a computer-assisted method of determining whether a set of data is to be graphically plotted in linear space or logarithmic space. The method includes receiving a set of data points to be plotted, classifying the data points, and computing a first entropy of a frequency of the data points. The method also includes computing a logarithmic transformation of each of the data points, classifying the logarithmically transformed data points, computing a second entropy of a frequency of the logarithmically transformed data points, and graphically plotting the data points in one of linear space and logarithmic space based on a comparison of the first entropy and the second entropy.

In various embodiments, the present invention is directed to a system. The system includes a server having graphical plotting software, the graphical plotting software configured to:
receive a set of data points to be plotted;
classify the data points;
compute a first entropy of a frequency of the data points;
compute a logarithmic transformation of each of the data points;
classify the logarithmically transformed data points;
compute a second entropy of a frequency of the logarithmically transformed data points; and
graphically plot the data points in one of linear space and logarithmic space based on a comparison of the first entropy and the second entropy; and
The system also includes at least one computer in communication with the server.

In various embodiments, the present invention is directed to a computer readable medium having stored thereon instructions which, when executed by a processor, cause the processor to:
receive a set of data points to be plotted;
classify the data points;
compute a first entropy of a frequency of the data points;
compute a logarithmic transformation of each of the data points;
classify the logarithmically transformed data points;
compute a second entropy of a frequency of the logarithmically transformed data points; and
graphically plot the data points in one of a linear space and a logarithmic space based on a comparison of the first entropy and the second entropy.

In various embodiments, the present invention is directed to an apparatus. The apparatus includes means for classifying a plurality of data points, means for computing a first entropy of a frequency of the data points, and means for computing a logarithmic transformation of each of the data points. The apparatus also includes means for classifying the logarithmically transformed data points, means for computing a second entropy of a frequency of the logarithmically transformed data points, and means for graphically plotting the data points in one of linear space and logarithmic space based on a comparison of the first entropy and the second entropy.

DESCRIPTION

Figure 1A:
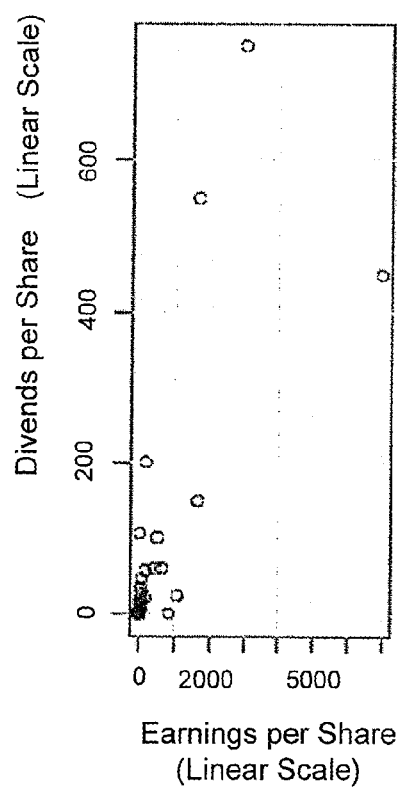
FIG. 1A illustrates a plot of data (dividends per share of stock) in linear space.
Figure 1B:
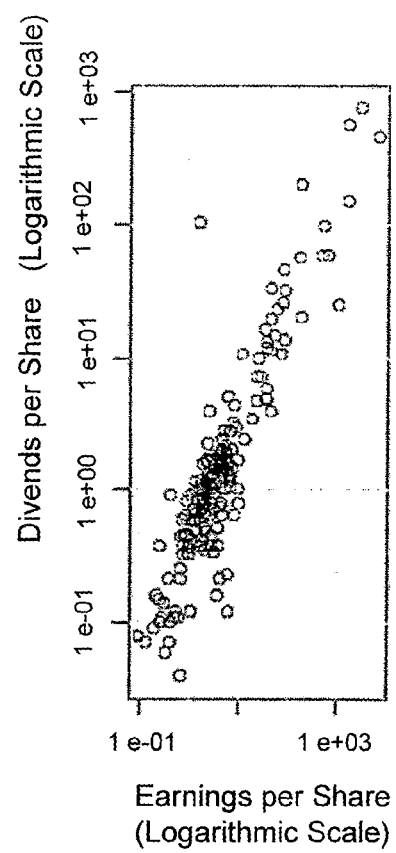
FIG. 1B illustrates a plot of the data from FIG. 1A in logarithmic space.

In various embodiments, the present invention allows for data to be plotted in either logarithmic or linear space depending on an automatic determination as to which type of plot better represents the plotted data. In various embodiments, the present invention employs an entropy calculation to determine in which space to plot the data. For example, in the financial services industry, data variables such as market capitalization and revenue have long-tailed distributions and are often better plotted in logarithmic space. FIG. 1A illustrates a plot of data (dividends per share of stock vs. earnings per share of stock) in linear space and FIG. 1B illustrates a plot of the same data in logarithmic space. Each plotted point in FIGS. 1A and 1B represents a different security. As can be seen from FIGS. 1A and 1B, there is a clear linear relationship between the plotted variables in the logarithmic plot of FIG. 1B as compared with the linear plot of FIG. 1A. As can be seen in FIG. 1A, in a linear space, both the x and y axes (or the vertical and horizontal axes) are scaled linearly. As can be seen in FIG. 1B, in a logarithmic space, both the x and y axes (or the vertical and horizontal axes) are scaled logarithmically.

Figure 2A:
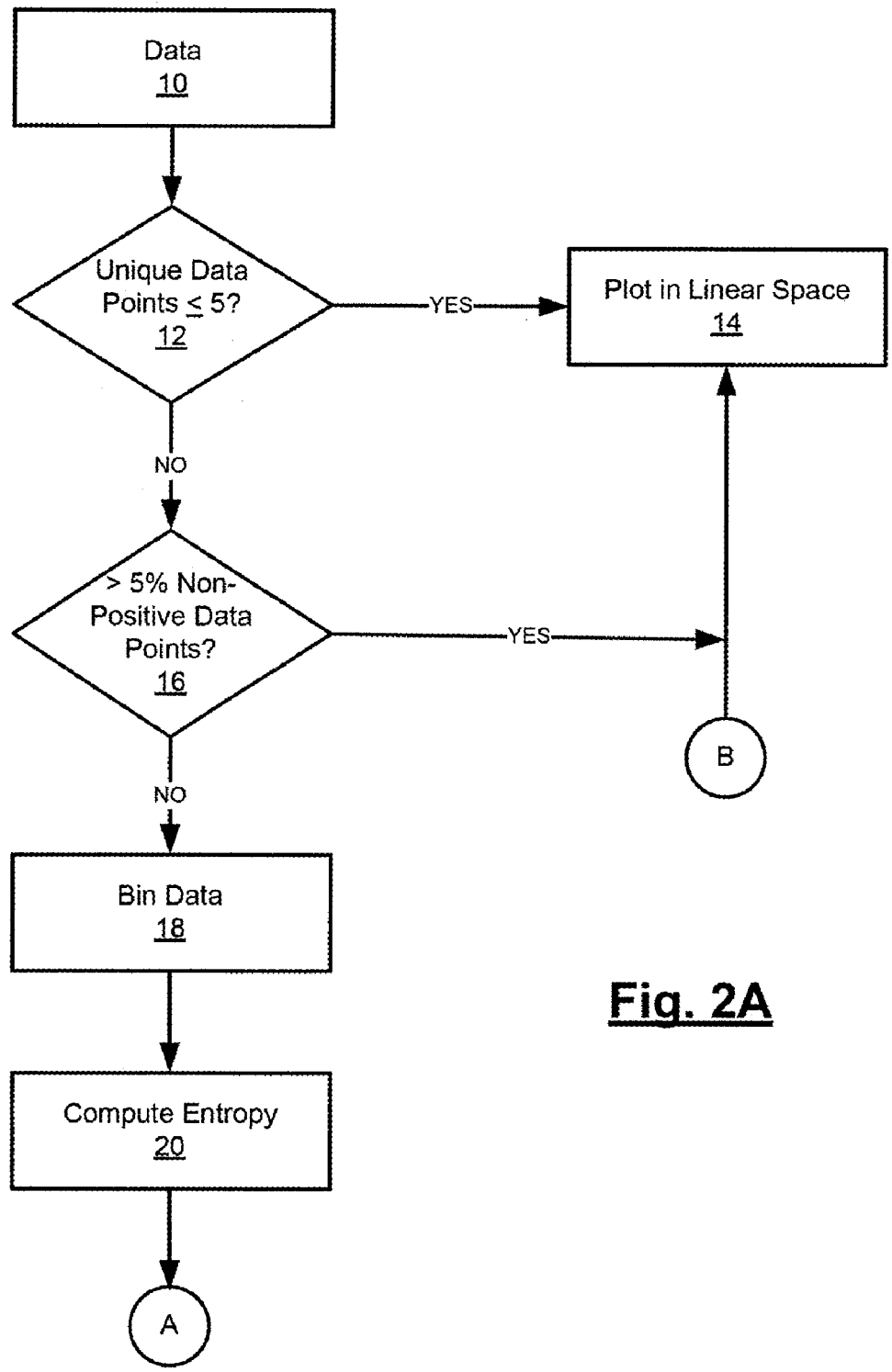
FIGS. 2A and 2B illustrate an embodiment of a process for determining whether data should be plotted in linear or logarithmic space.
Figure 2B:
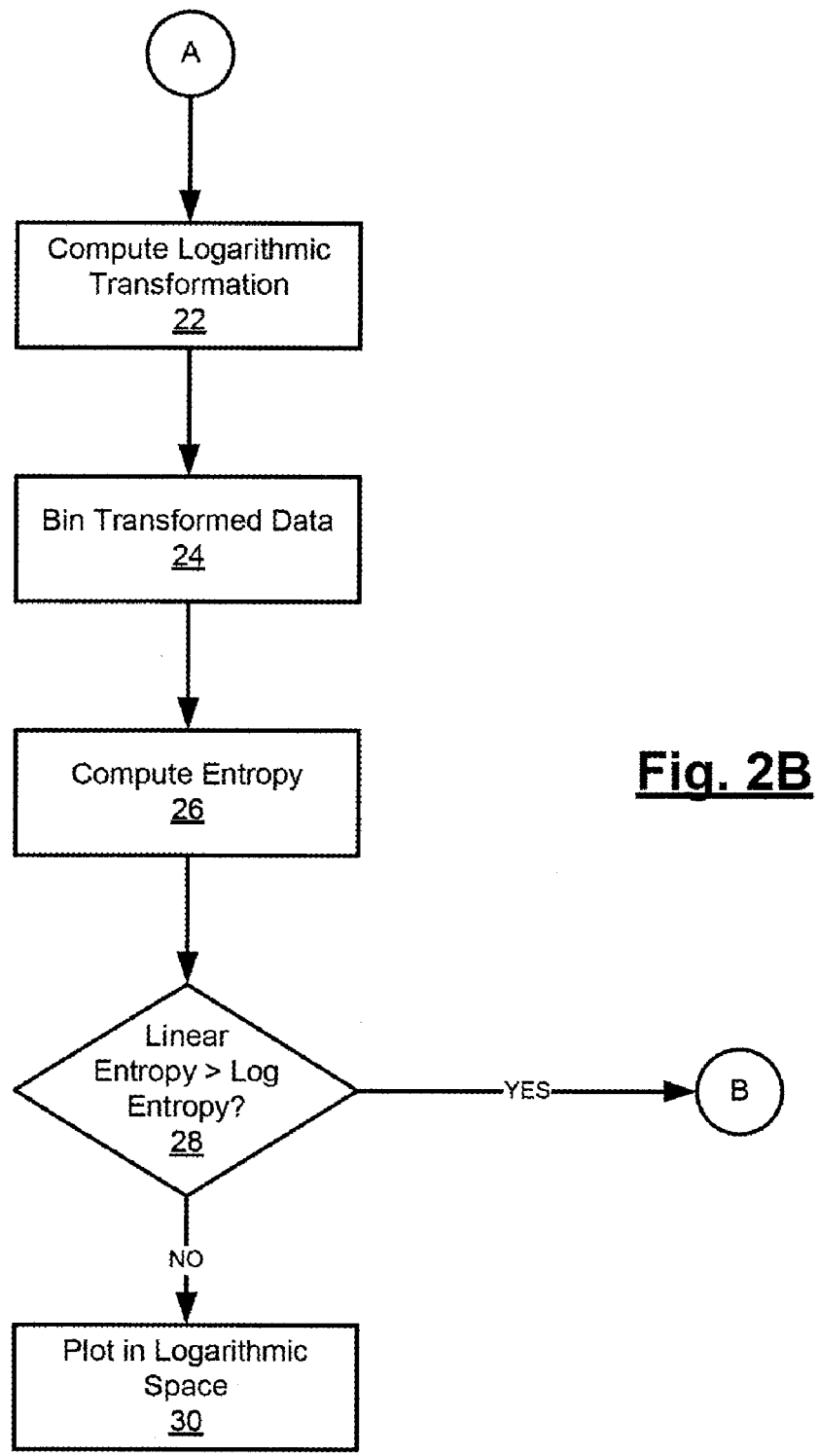

FIGS. 2A and 2B illustrate an embodiment of a process for determining whether data 10 should be plotted in linear or logarithmic space. At step 12, it is determined if the data 10 to be plotted has less than or equal to, for example, 5 unique data points. In various embodiments, a unique data point is a data point that does not overlap another data point. For example, the two-dimensional data set (x,y)={(1,1), (2,2), (1,1), (1,1), (1,1)} has five data points but has two unique data points because the last three data points overlap with the first data point. If there are less than or equal to 5 unique data points, at step 14 the data are plotted in linear space.

If the data has more than 5 unique data points, the process determines at step 16 whether more than, for example, 5% of the data points are non-positive. In various embodiments, non-positive data points include data points that have positive values or zeroes in one dimension. If there are more than 5% non-positive data points, the data are plotted in linear space at step 14. Otherwise, the process advances to step 18, where the data are binned. In various embodiments, the data are binned in, for example, 10 bins with a triangular kernel {0.1, 0.8, 0.1}. At step 20, the entropy of the frequencies of the data points is calculated using:

$$H(x) = -\sum_{i=1}^{N} p_i \log(p_i) \quad (1)$$

where x is each data point, p is the percentage of data points that fall into different bins, and N is the number of data points.

At step 22, a log transformation y=log(x) is made for each data point. Negative data points are treated as outliers. In various embodiments, negative data points are data points that have negative values in one dimension. In various embodiments, y may be represented as y=√x or y=1/x. At step 24, the logarithmic data points are binned in the same manner as the data were binned at step 18. At step 26, the entropy of the frequencies of the logarithmic data points is calculated using:

$$H(y) = -\sum_{i=1}^{N} p_i \log(p_i) \quad (2)$$

At step 28, the computed entropy for the linear data points is compared with the computed entropy for the logarithmic data points. If the computed entropy for the linear data points is greater than the computed entropy for the logarithmic data points, the plot is made in linear space at step 14. Otherwise, the plot is made in logarithmic space at step 30.

Various embodiments of the present invention may be used by, for example, analytical engines that do not know in advance the distribution of data and must make a determination as to whether a linear or a logarithmic plot should be made during data analysis. Various embodiments of the present invention may be incorporated into plotting tools or software that automate data plotting so that a user does not have to decide whether to plot data in linear space or logarithmic space using trial and error.

Figure 3:
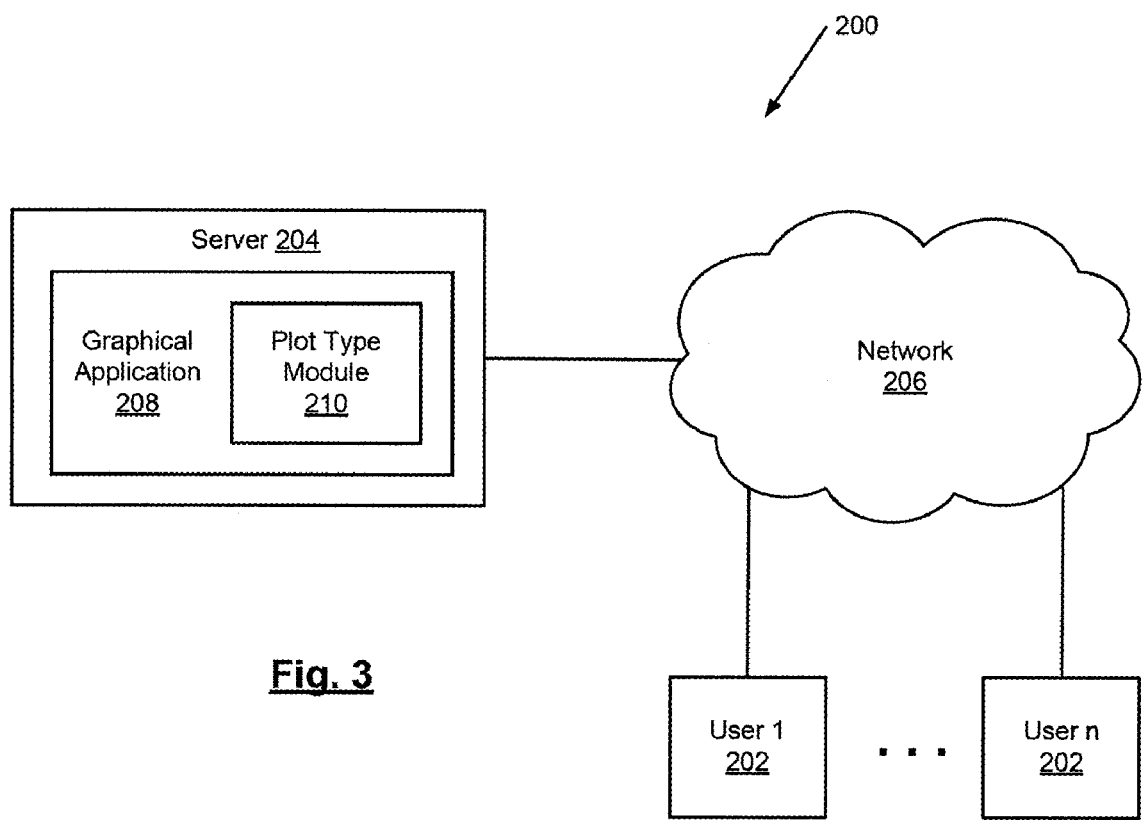
FIG. 3 is a diagram illustrating various embodiments of a system 200 in which embodiments of the present invention may be used.

FIG. 3 is a diagram illustrating various embodiments of a system 200 in which embodiments of the present invention may be used. In the system 200, user computers 202 are in communication with a server 204 via a network 206. The network may be, for example, the Internet, an intranet, a local area network (LAN), a wide area network (WAN), etc. The server 204 may be any type of server that is suitable for executing an application, such as a graphical application 208 that constructs plots of data for display on the user computers 202. The graphical application 208 includes a plot type module, or object, 210 that automatically determines whether data to be plotted should be displayed in linear space or logarithmic space using embodiments of the process described hereinabove in conjunction with FIGS. 2A and 2B.

Although the system 200 described in conjunction with FIG. 3 is illustrated as a distributed processing arrangement, it can be understood that the plot type module 210 may be included as part of a graphical application 208 that is resident on one or more the of the user computers 202.

The term "computer-readable medium" is defined herein as understood by those skilled in the art. It can be appreciated, for example, that method steps described herein may be performed, in certain embodiments, using instructions stored on a computer-readable medium or media that direct a computer system to perform the method steps. A computer-readable medium can include, for example and without limitation, memory devices such as diskettes, compact discs of both read-only and writeable varieties, digital versatile discs (DVD), optical disk drives, and hard disk drives. A computer-readable medium can also include memory storage that can be physical, virtual, permanent, temporary, semi-permanent and/or semi-temporary.

As used herein, a "computer" or "computer system" may be, for example and without limitation, either alone or in combination, a personal computer (PC), server-based computer, main frame, microcomputer, minicomputer, laptop, personal data assistant (PDA), cellular phone, pager, processor, including wireless and/or wireline varieties thereof, and/or any other computerized device capable of configuration for processing data for either standalone application or over a networked medium or media. Computers and computer systems disclosed herein can include memory for storing certain software applications used in obtaining, processing, storing and/or communicating data. It can be appreciated that such memory can be internal or external, remote or local, with respect to its operatively associated computer or computer system. The memory can also include any means for storing software, including a hard disk, an optical disk, floppy disk, ROM (read only memory), RAM (random access memory), PROM (programmable ROM), EEPROM (extended erasable PROM), and other suitable computer-readable media.

It is to be understood that the figures and descriptions of embodiments of the present invention have been simplified to illustrate elements that are relevant for a clear understanding of the present invention, while eliminating, for purposes of clarity, other elements. Those of ordinary skill in the art will recognize, however, that these and other elements may be desirable for practice of various aspects of the present embodiments. However, because such elements are well known in the art, and because they do not facilitate a better understanding of the present invention, a discussion of such elements is not provided herein. It can be appreciated that, in some embodiments of the present methods and systems disclosed herein, a single component can be replaced by multiple components, and multiple components replaced by a single component, to perform a given function or functions. Except where such substitution would not be operative to practice the present methods and systems, such substitution is within the scope of the present invention. Examples presented herein, including operational examples, are intended to illustrate potential implementations of the present method and system embodiments. It can be appreciated that such examples are intended primarily for purposes of illustration. No particular aspect or aspects of the example method, product, computer-readable media, and/or system embodiments described herein are intended to limit the scope of the present invention.

It should be appreciated that figures presented herein are intended for illustrative purposes and are not intended as construction drawings. Omitted details and modifications or alternative embodiments are within the purview of persons of ordinary skill in the art. Furthermore, whereas particular embodiments of the invention have been described herein for the purpose of illustrating the invention and not for the purpose of limiting the same, it will be appreciated by those of ordinary skill in the art that numerous variations of the details, materials and arrangement of parts/elements/steps/functions may be made within the principle and scope of the invention without departing from the invention as described in the appended claims.

What is claimed is:

1. A computer-implemented method of determining whether a set of data is to be graphically plotted in linear space or logarithmic space, the method comprising:
   receiving, by a computer device, a set of data points to be plotted;
   determining, by the compute device, whether the set of data points has a number of unique data points greater than or equal to a threshold number of unique data points;
   upon a determination that the set of data points has a number of unique data points greater than or equal to a threshold number of unique data points:
      classifying, by the computer device, the data points into a first plurality of bins;
      computing, by the computer device, a first entropy of a frequency of the data points based on a percentage of the data points that fall into each of the first plurality of bins;
      computing, by the computer device, a logarithmic transformation of each of the data points;
      classifying, by the computer device, the logarithmic transformations of the data points into a second plurality of bins;
      computing, by the computer device, a second entropy of a frequency of the logarithmic transformations of the data points based on a percentage of the logarithmic transformations that fall into each of the second plurality of bins;
      comparing, by the computer device, the first entropy to the second entropy; and
      causing to be graphically plotted, by the computer device, the data points in one of the following manners:
         (a) plotting the data points in linear space upon a determination that the first entropy is greater than the second entropy; or
         (b) plotting the data points in logarithmic space upon a determination that the first entropy is less than the second entropy, wherein both an x axis and a y axis are scaled linearly in the linear space, and wherein both the x axis and the y axis are scaled logarithmically in the logarithmic space,
   wherein the computer device comprises a processor and a memory that stores instructions executed by the processor.

2. The method of claim 1, wherein classifying logarithmic transformations of the data points includes binning the logarithmic transformations of the data points with a triangular kernel.

3. The method of claim 1, further comprising graphically plotting the data points in linear space when there is less than 5 unique data points.

4. The method of claim 1, further comprising graphically plotting the data points in linear space when a number of the data points that are non-positive is greater than a predetermined number.

5. The method of claim 1, wherein classifying the data points includes binning the data points with a triangular kernel.

6. The method of claim 5, wherein the first plurality of bins comprises ten bins and the second plurality of bins comprises ten bins.

7. The method of claim 5, wherein the first entropy of the frequency of the data points is calculated based on the equation $$H(x) = -\sum_{i=1}^{N} p_i \log(p_i),$$

where $H(x)$ is the first entropy, x represents the data points, p is the percentage points of data points that fall into the bins of the first plurality of bins, and N is the number of data points.

8. A system for determining whether a set of data is to be graphically plotted in linear space or logarithmic space, the system comprising:
   a server having graphical plotting software, the graphical plotting software configured to:
      receive a set of data points to be plotted;
      determine whether the set of data points has a number of unique data points greater than or equal to a threshold number of unique data points; and
      upon a determination that the set of data points has a number of unique data points greater than or equal to a threshold number of unique data points:
         classify the data points into a first plurality of bins;
         compute a first entropy of a frequency of the data points based on a percentage of the data points that fall into each of the first plurality of bins;
         compute a logarithmic transformation of each of the data points;
         classify the logarithmic transformations of the data points into a second plurality of bins;
         compute a second entropy of a frequency of the logarithmic transformations of the data points based on a percentage of the logarithmic transformations that fall into each of the second plurality of bins;
         compare the first entropy to the second entropy; and
         determine whether the data points should be graphically plotted in linear space or logarithmic space based on the comparison of the first entropy to the second entropy by one of the following:
            determining that the data points should be graphically plotted in linear space when the first entropy is greater than the second entropy, wherein both an x axis and a y axis are scaled linearly in the linear space; and
            determining that the data points should be graphically plotted in logarithmic space when the first entropy is less than the second entropy, wherein both the x axis and the y axis are scaled logarithmically in the logarithmic space; and
   at least one computer in communication with the server that displays a graphical plot of the data points in the space determined by the server.

9. The system of claim 8, wherein the at least one computer is in communication with the server via a network.

10. The system of claim 9, wherein the network is one of the Internet, a LAN, a WAN, and an intranet.

11. A non-transitory computer readable medium having stored thereon instructions which, when executed by a processor, cause the processor to:
   receive a set of data points to be plotted;
   determine whether the set of data points has a number of unique data points greater than or equal to a threshold number of unique data points;
   upon a determination that the set of data points has a number of unique data points greater than or equal to a threshold number of unique data points
      classify the data points into a first plurality of bins;

compute a first entropy of a frequency of the data points based on a percentage of the data points that fall into each of the first plurality of bins;

compute a logarithmic transformation of each of the data points;

classify the logarithmic transformations of the data points into a second plurality of bins;

compute a second entropy of a frequency of the logarithmic transformations of the data points based on a percentage of the logarithmic transformations that fall into each of the second plurality of bins;

compare the first entropy to the second entropy; and determine whether the data points should be graphically plotted in linear space logarithmic space based on the comparison of the first entropy to the second entropy by one of the following:

determining that the data points should be plotted in linear space when the first entropy is greater than the second entropy, wherein both an x axis and a y axis are scaled linearly in the linear space; and determining that the data points should be plotted in logarithmic space when the first entropy is less than the second entropy, wherein both the x axis and the y axis are scaled logarithmically in the logarithmic space.

12. An apparatus for determining whether a set of data is to be graphically plotted in linear space or logarithmic space, the apparatus comprising:

means for determining whether the set of data points has a number of unique data points greater than or equal to a threshold number of unique data points;

means for classifying, upon a determination that the set of data points has a number of unique data points greater than or equal to a threshold number of unique data points, a plurality of data points into a first plurality of bins;

means for computing a first entropy of a frequency of the data points based on a percentage of the data points that fall into each of the first plurality of bins;

means for computing a logarithmic transformation of each of the data points;

means for classifying the logarithmic transformations of the data points into a second plurality of bins;

means for computing a second entropy of a frequency of logarithmic transformations of the data points based on a percentage of the logarithmic transformations that fall into each of the second plurality of bins;

means for comparing the first entropy to the second entropy; and means for graphically plotting the data points in one of the following manners:

in linear space when the first entropy is greater than the second entropy; and in logarithmic space when the first entropy is less than the second entropy, wherein both an x axis and a y axis are scaled linearly in the linear space, and wherein both the x axis and the y axis are scaled logarithmically in the logarithmic space.

13. A computer-implemented method of determining whether a set of data is to be graphically plotted in linear space or logarithmic space, the method comprising:

receiving, by a computer device, a set of data points to be plotted;

determining, by the computer device, that the data points should be plotted in linear space when the number of data points in the set of data points that is unique is less than a threshold number;

when the number of data points in the set of data points that is unique is not less than the threshold number, determining, by the compute device, that the data points should be plotted in linear space when a percentage of the data points in the set of data points that is non-positive is less than a threshold percentage; and when both (i) the number of data points in the set of data points that is unique is not less than the threshold number and (ii) the percentage of the data points in the set of data points that is non-positive is not less than the threshold percentage:

classifying, by the computer device, the data points into a first plurality of bins;

computing, by the computer device, a first entropy of a frequency of the data points based on a percentage of the data points that fall into each of the first plurality of bins;

computing, by the computer device, a logarithmic transformation of each of the data points;

classifying, by the computer device, the logarithmic transformations of the data points into a second plurality of bins;

computing, by the computer device, a second entropy of a frequency of the logarithmic transformations of the data points based on a percentage of the logarithmic transformations that fall into each of the second plurality of bins;

comparing, by the computer device, the first entropy to the second entropy; and causing to be graphically plotted, by the computer device, the data points in one of the following manners:

in linear space when the first entropy is greater than the second entropy; and in logarithmic space when the first entropy is less than the second entropy, wherein both an x axis and a y axis are scaled linearly in the linear space, and wherein both the x axis and the y axis are scaled logarithmically in the logarithmic space; and wherein the computer device comprises a processor and a memory that stores instructions executed by the processor.

* * * * *